United States Patent [19]

Beecher

[11] Patent Number: 4,758,077
[45] Date of Patent: * Jul. 19, 1988

[54] BINOCULAR USING COLLIMATING MIRROR TO REPLACE PORRO PRISMS

[76] Inventor: William J. Beecher, 1960 Lincoln Park West, Chicago, Ill.

[*] Notice: The portion of the term of this patent subsequent to Dec. 18, 2001 has been disclaimed.

[21] Appl. No.: 723,543

[22] Filed: Apr. 15, 1985

[51] Int. Cl.$^4$ .................. G02B 23/02; G02B 7/18
[52] U.S. Cl. .................. 350/545; 350/569; 350/631
[58] Field of Search .......... 350/287, 545–556, 350/569, 586, 589–590, 631, 633–634

[56] References Cited

U.S. PATENT DOCUMENTS

| | | | |
|---|---|---|---|
| 471,708 | 3/1892 | Rudall | 350/611 |
| 1,533,248 | 4/1925 | Harwix | 350/551 |
| 2,212,123 | 8/1940 | Neill et al. | 350/556 |
| 3,676,274 | 7/1972 | Matulis | 350/641 |
| 3,866,140 | 2/1975 | Hobart et al. | 350/634 |
| 4,140,568 | 2/1979 | Beecher | 156/560 |
| 4,488,790 | 12/1984 | Beecher | 350/545 |

FOREIGN PATENT DOCUMENTS 836260 4/1952 Fed. Rep. of Germany ...... 350/569

OTHER PUBLICATIONS

Trsar et al., "Production Engineering & Implementation of a Modular Military Binocular", SPIE, vol. 250, 1980, pp. 27–36.

Primary Examiner—William H. Punter

[57] ABSTRACT

In a binocular employing mirrors in place of Porro prisms as an erector system, including a pair of telescopes each having a hollow body shell, a plurality of mirrors in the shell and arranged to provide a folded light path therethrough, eyepiece and objective barrels mounted on the shell and having, respectively, eyepiece and objective lenses therein and disposed at opposite ends of the light path, such mirrors being ovally-shaped and sized to conform to the respective cross sections thereat of the light bundle transmitted by the objective lenses, the shell defining an internal arcuate mirror rim-receiving surface for each of the mirrors and a portion of the rim of each mirror being adhesively secured to the receiving surface therefor by an elastic adhesive; and hinge structure including a hinge post connecting the telescopes together for adjustment of the interpupillary spacing of the eyepiece barrels, the improvement being that each mirror pair is first mounted at right angles in a hood-shaped cover, which is then delivered for elastic cementing into the binocular body shell instead of cementing the mirrors into the body shell first. The cover comprises two flat oval plates at right angles, each having three conical bosses to the apices of which the back side of a mirror is permanently cemented for collimating purposes before the cover is cemented into the body shell with an elastic adhesive which will fix the mirror edges elastically to arcuate matching surfaces of the shell wall at the same time the hood-like cover is cemented to matching surfaces of the body shell to close and complete the binocular.

8 Claims, 1 Drawing Sheet

U.S. Patent   Jul. 19, 1988   4,758,077
FIG. 1
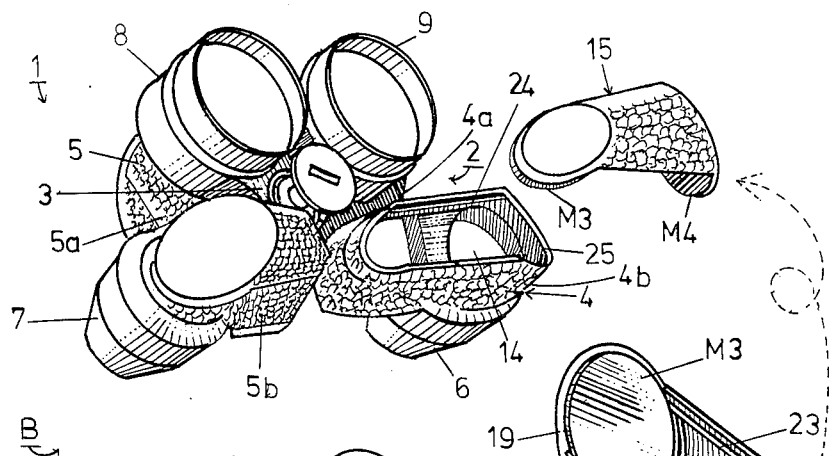
FIG. 2
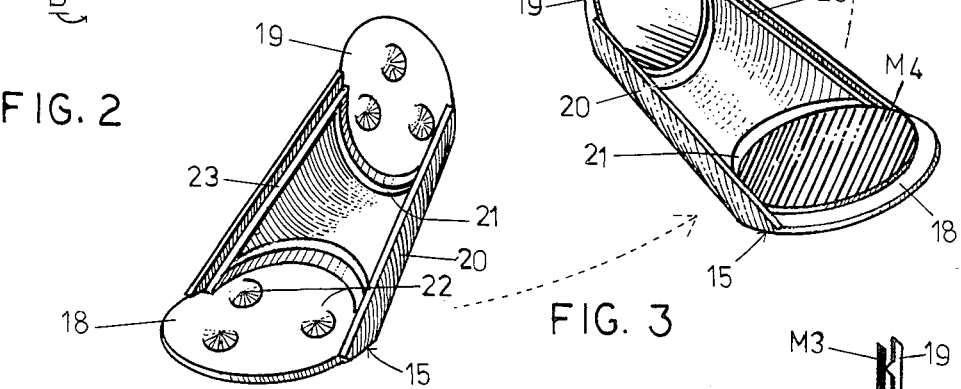
FIG. 3
FIG. 4
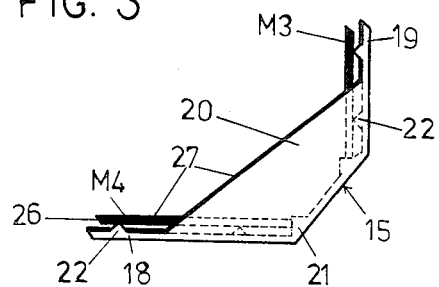

BINOCULAR USING COLLIMATING MIRROR TO REPLACE PORRO PRISMS

DESCRIPTION

1. Technical Field

This invention deals with apparatus for introducing eight mirrors into the twin telescopes of a binocular in pairs, each mirror rigidly cemented to three conical raised bosses on a flat, oval plate disposed at right angles to a similar plate, thus forming a hood-like cover for an opening in body shell, to the end that the insertion of four such covers with their paired mirrors into the twin shells of such a binocular for elastic edge cementing to the arcuate wall surfaces of the shells results in the collimation of the binocular at the same time that the body shells are covered and the binocular completed.

2. Background Art

Binoculars have been made for 140 years with right-angle prisms used in pairs to erect the image formed by the objective lens, ever since the Italian, Porro, invented this prism. In 1947 John R. Miles (U.S. Pat. No. 2,424,283) showed how the seemingly insuperable problem of collimating eight mirrors to accomplish the work of 4 right angle prisms might be achieved. Primarily, he depended on the accuracy of modern die-molding techniques to create a body shell with sufficiently-accurate rim surfaces to which his aluminum mirrors could be screwed. But the heart of his idea lay in three accurately-machined bosses on each mirror rim to which the aluminum mirrors, additionally shimmed where necessary, could be screwed.

The Beecher binocular of U.S. Pat. No. 4,488,790, on which the present invention represents an improvement, differs from the Miles binocular in several important ways. The Miles binocular was large and heavy; the Beecher binocular is small and light. The Miles binocular employed relatively massive aluminum mirrors, one fifth as thick as long to maintain flatness of one wavelength against the stress of screwing-down; the Beecher glass mirrors are one-thirtieth as thick as long and maintain ½ wavelength flatness by being edge-cemented with elastic adhesive. Thus, they fit the body shell exactly whereas the Miles mirrors are oversize to overlap the opening to which they are screwed from the outside. An earlier Beecher binocular, U.S. Pat. No. 3,985,421, also employed oversize, thick, glass mirrors that were cemented into recesses in the body shell. The problem with the Beecher binocular (U.S. Pat. No. 4,488,790) was how to achieve a rigid collimation with eight thin mirrors, using an elastic adhesive. His first solution was the press mechanism described in his U.S. Pat. No. 4,140,568, in a variant of which 4 mirrors are held in accurate collimated relationship in the head of the press by vacuum, to be delivered into the body shell of the binocular when the head is lowered, there to be elastically cemented to the binocular shell wall. This was too slow and inefficient because the lowered head would have to remain lowered until the slow-setting elastic cement set firmly, during which waiting period the press was out of action. When the vacuum could be released and the head raised, the binocular body shell could be flipped over on a hinged base-plate and 4 more mirrors delivered into the reverse side to complete the installation with the same waiting period. The method of the present invention for accomplishing the same action, described below, is remarkably simple and entails no waiting period at all.

DISCLOSURE OF THE INVENTION

This invention describes an improvement in the method of constructing and achieving the binocular which is the subject of U.S. Pat. No. 4,488,790 or any similar mirror binocular. In such a binocular, including a pair of hingedly-connected telescopes, each having a hollow body shell and a plurality of mirrors arranged in the shell to provide a folded light path therethrough in Porro 1 conformation, and having eyepiece and objective lenses disposed at opposite ends of each shell, the shell defining an internal arcuate mirror-rim receiving surface for each of the oval mirrors, which are sized to conform to the respective cross sections thereat of the light bundle transmitted by the objective lens, the improvement is that each mirror pair is first mounted at right angles to each other in a hood-shaped cover, which is delivered for elastic cementing into the binocular body shell. The cover comprises two flat oval plates, joined at right angles by a conical hood, each plate having three cone-shaped bosses arranged in a triangle, to the apices of which a mirror is permanently cemented with instantaneous cement for collimating purposes, afterward applying to the edges only the elastic cement which will fix the oval mirror strainlessly to the matching arcuate surfaces of the binocular shell wall at the same time the cover is cemented to the body shell, closing it and, when all four mirror pairs are thus installed, collimating the binocular.

BRIEF DESCRIPTION OF THE DRAWINGS

FIG. 1 is a front pictorial view of the binocular, viewed at an angle of about 45° from the left and below, with the front left mirror cover removed from the body shell, the cover containing two mirrors. The straight margins of the opening into the body shell are of half-lap construction, molded-in, and the mating straight edges of the cone-shaped hood portion of the mirror cover fit perfectly for cementing the mirror cover into the body shell. There are four mirror covers, mating with four body shell openings to complete the binocular.

FIG. 2 is a view of the inside of a mirror cover, showing the two oval flat plates at right angles to each other for receiving the mirrors, with arcuate stops at the innermost borders of the plates to limit the inward extent of the mirrors and with three conical bosses on the apices of which the back sides of the mirrors are cemented with instant-setting cement. The flat plates are joined by a conical hood, the straight edges of which are of half-lap construction for mating with similar straight edges of the shell opening.

FIG. 3 is a view of the inside of a mirror cover with the mirrors cemented in place and ready to be rotated and inserted into the binocular body for cementing.

FIG. 4 is a cross-sectional side view of a mirror cover, showing the two mirror-receiving plates at right angles to each other, with only two of the three conical bosses showing for each plate and with two mirrors in place against their arcuate stops. The mirrors are cemented with fast-setting permanent cement at the apices of the three conical bosses. Black areas indicate the rims of the mirrors and of the edges of the cover plates and of the straight edge of the covers where elastic cement is applied, preliminary to cementing the mirror covers with their attached (and collimated) mirrors into the body shell.

BEST MODE FOR CARRYING OUT THE INVENTION

FIGS. 1-4 depict a binocular much like that of my U.S. Pat. No. 4,488,790. The binocular B comprises a pair of complementary right-hand and left-hand (as viewed from the rear) telescopes 1 and 2, which are connected together by a central hinge 3 for swinging movement thereabout toward and away from each other for interpupillary adjustment.

The telescopes 1 and 2 are mirror images of each other. They include respective left and right hollow body shells 4 and 5, which have respective upper frusto-conical tubular shell portions 4a and 5a, and respective lower frusto-conical tubular shell portions 4b and 5b. Each of the shells 4 and 5 is molded of plastic, preferably polycarbonate. The axes of the upper shell portions 4a and 5a are positioned substantially at right angles to the axes of the lower shell portions 4b and 5b, respectively, in order to subtend a right angle space between the axes of the portions of each shell. The shell portions are arranged with the small bases of the upper shell portions 4a and 5a intersecting the small bases of the lower shell portions 4b and 5b, respectively. In the illustrative preferred embodiment of the invention, the foregoing axes of the shell portions 4a,4b,5a and 5b and the hinge 3 connecting the shells 4 and 5 together have the general configuration of the letter "n X", as viewed from the rear, or facing the eyepiece lenses, described hereinafter.

Identical rearwardly-disposed left and right eyepiece-lens containing eyepiece barrels 6 and 7 are mounted on the large bases of the lower shell portions 4b and 5b, respectively. Identical forwardly-disposed right and left objective lens-containing objective barrels 8 and 9 are mounted on the large bases of the upper shell portions 5a and 4a, respectively. Each of the hinged-together telescopes 1 and 2 contains an identical optical system, consisting of five eyepiece lenses and two objective lenses.

The paired mirrors in front and the paired mirrors in the rear of the binocular (M1 and M2, and M3 and M4, respectively) are disposed at an angle of 90° to each other, exactly duplicating the light path through a pair of right angle prisms arranged in porro 1 relationship, thus providing a folded light path between the objective lenses (8 and 9) and the eyepiece lenses (6 and 7). Only mirrors M3 and M4 are shown.

Coming now (FIGS. 2-4) to what is deemed new and patentable about the present invention, the paired mirrors are mounted permanently in four hood-like covers before being introduced into the four elongate body-shell openings of the twin telescopes that comprise the complete binocular. These four covers are almost identical to the cup-shaped mirror covers identified in U.S. Pat. No. 4,488,790 but only the left front hood-like cover 15 and the corresponding elongated front body shell opening 14 are illustrated in FIG. 1. Despite the similarity to the mirror cover of the above-mentioned invention, there is a major difference. In the present invention the mirror covers are no longer passive caps to seal the mirrors safely inside by completing the housing of the body shell, once the mirrors have been cemented in place after collimation by the press mechanism which is a variant of that described in my U.S. Pat. No. 4,140,568. The hood-shaped covers 15 of the present invention (FIGS. 2-4) now comprise two oval mirror-holding flat plates, a large one 18 and a smaller one 19, facing each other at right angles and held in this position by a conical hood 20, each plate having an arcuate mirror stop 21 to limit the extreme inward extant of the mirror and three cone-shaped bosses 22, arranged in a triangle, on the apices of which the mirror (M3 or M4) rests and is permanently-cemented to by an instantaneous cement. The straight edges of the hood 15 are of half-lap design, exactly mating with the corresponding half-lap construction of the body shell opening 14, all parts being so accurately-molded and the conical bosses so corrected in individual elevation that, with all the mirror covers firmly in place in their respective body shell openings, collimation is automatically achieved when all four hood-shaped covers with their contained mirror pairs are inserted into the four body shell openings of the binocular.

The advantage of the above-described method of collimating the mirrors permanently in the hood-shaped covers is at once apparent. With the slow and elaborate press-mechanism method of inserting mirrors one may discover upon completion of the process that collimation is not achieved. It is impossible to guess which mirror slipped. In the present method, all four mirror sets in their covers may be inserted into the binocular shell openings on a trial basis. If collimation is not achieved, other covers with their paired mirrors may be tried in succession before applying the elastic cement that will fix the covers and mirrors in the body shell in permanent collimation. With all half-lap surfaces of covers and body shell perfectly designed in the molds, and with three bosses on each mirror and eight mirrors, only 24 points have to be perfect within 0.002" to achieve collimation (3 bosses×8 mirrors=24 points).

The elastic cement (contact cement, elastic plastic or silicone rubber) is drawn in black in FIG. 4. It is dispensed with pipette-tipped plastic squeeze bottles in narrow ribbons on mating half-lap surfaces of the straight portions 23 of hood cover 15 and straight portion 24 of body-shell 4 and on the edge of the mirror (M3 or M4), ground at 45°, at the outer edge 26 for mating with the arcuate portion of the body shell opening 25. It holds the mirror by the edge without straining it out of its ½ wavelength flatness, and holds the cover 15 firmly in place in the body shell opening 14, collimated and waterproof. The parts are mated immediately without waiting for the cement to become tacky as would be normal procedure when using contact cement. A further advantage of the new method here presented is that contact cement may be applied to the inner edge of the mirror M4, which is not bevelled at 45°, bonding it to the fitted arcuate stop 21 of the conical hood 20, which exactly fits the oval shape of the mirror at that point. Thus the mirror is held to the body shell of the binocular by the rubber adhesive around its entire edge, rather than only half-way round as in my previous patent to the end that it makes a complete resilient contact with the mating surfaces of the body shell all around. Additionally, one has the option of using the solvent for the molded plastic parts to fuse the mirror cover hoods to the body shell openings along the half-lapped mating straight edges of each. In the case of the polycarbonate preferred here, methylene chloride is the solvent, but other plastics might be used and other solvents.

I claim:

1. In a binocular including a pair of telescopes, each having a body shell, a plurality of collimated mirrors in said shell, arranged to provide a folded light path therethrough, and eyepiece and objective lenses mounted on said shell at opposite ends of said light path, the mirrors ovally-shaped and sized to conform to the respective cross sections of the light bundle transmitted by said objective lenses, and wherein said shell defines an internal arcuate mirror edge-receiving surface for each of said mirrors and a portion of the edge of each mirror is adhesively secured to the said receiving surface therefor by an elastic adhesive, and in which the body shell exactly conforms to the changing cross section of the light bundle, and the openings in the body shell in which the mirrors are cemented are closed by cementing in place passive mirror covers, the improvement being that the mirror covers now contain the collimated mirrors in pairs, to be introduced into the optical system when the covers are cemented to the body shell.

2. In a binocular as described in claim 1 in which the aforesaid mirror covers have two oval plates for receiving mirrors, the plates joined at right angles to each other by a conical hood having half-lap straight edges for mating with similar edges of the body shell openings.

3. In a binocular as described in claim 2, in which the plates of claim 2 have arcuate stops limiting the inward extent of the mirror, to which the mirror is adhered with elastic adhesive.

4. In a binocular in which the cover plates of claims 2 or 3 have three raised conical bosses, accurately molded for collimation purposes, to the apices of which the back sides of the mirrors are cemented with a permanent, instantaneous-setting cement, said bosses being arranged in a triangle.

5. In a binocular in which the mirror covers with collimated mirrors contained, as described in claims 2 or 3, are treated with ribbons of elastic adhesive on all edges, of mirror, of mirror cover and mating surfaces of each in the body shell opening, to the end that the act of introducing the covers and paired mirrors into the body openings of the binocular at once close the binocular openings, adhere the mirrors to their arcuate mating surfaces of the body wall and collimate the binocular.

6. In a binocular as described above in claims 1, 2 or 3, and in which the entire edge of the mirror is treated with a ribbon of elastic adhesive to the end that it makes a complete resilient contact with mating surfaces of the body shell all around.

7. In a binocular as described in claims 1, 2 or 3 and in which the elastic adhesive includes not only cements containing rubber but also elastic plastics which do not contain rubber.

8. In a binocular as described in claims 1, 2 or 3 and in which the solvent for the plastic in which the parts are molded is used in place of elastic adhesive to fuse mirror covers to body shell along the half-lap mating edges of mirror cover and body shell.

* * * * *